Thomas S. Gillis, Jr.
John W. Pennington
Elry C. Bird
             INVENTORS

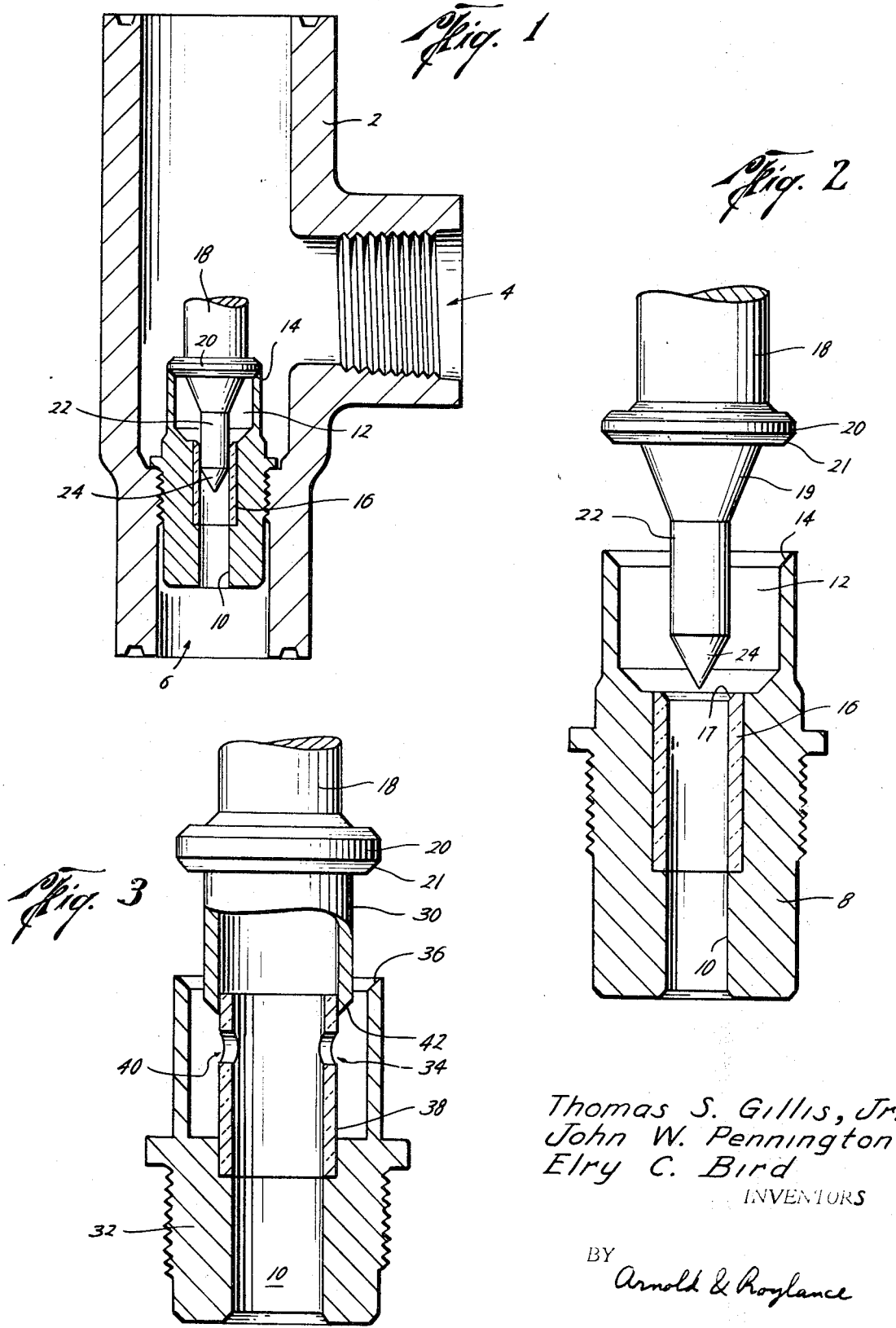
Thomas S. Gillis, Jr.
John W. Pennington
Elry C. Bird
INVENTORS
BY Arnold & Roylance
ATTORNEYS July 28, 1970     T. S. GILLIS, JR., ETAL     3,521,853
THROTTLE AND SHUTOFF VALVE
Filed Dec. 12, 1966     3 Sheets-Sheet 2

BY Arnold & Roylance

ATTORNEYS

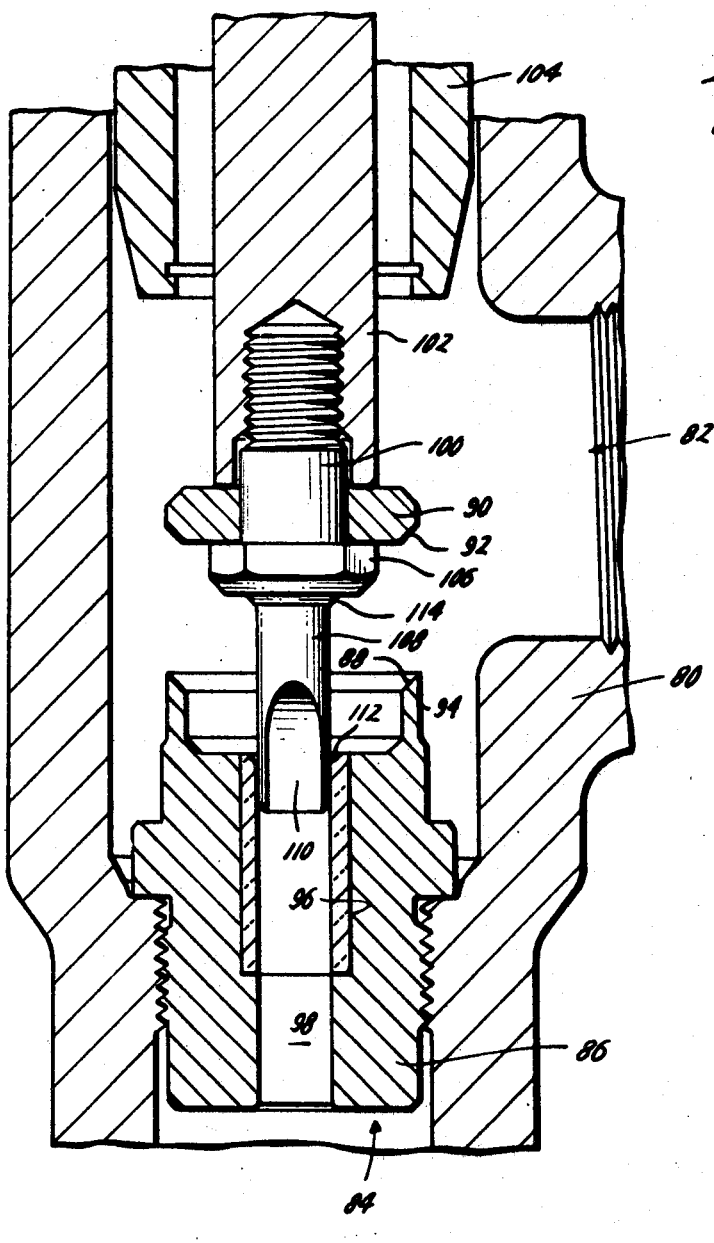

United States Patent Office 3,521,853
Patented July 28, 1970

3,521,853
THROTTLE AND SHUTOFF VALVE
Thomas S. Gillis, Jr., P.O. Box 7907, Houston, Tex. 77007, and John W. Pennington and Elry C. Bird, Houston, Tex.; said Pennington and said Bird assignors to said Gillis
Filed Dec. 12, 1966, Ser. No. 600,963
Int. Cl. F16k 47/08
U.S. Cl. 251—122                                   3 Claims

ABSTRACT OF THE DISCLOSURE

Improved throttling and shutoff apparatus is provided for controlling high velocity fluid flow. In particular, provision is made for full throttling before the shutoff surfaces are brought together to fully interrupt all flow. In addition, provision is made for reducing fluid velocity across the shutoff surfaces during shutoff.

---

This invention relates to apparatus for controlling and interrupting the flow of fluid under high-pressure, and more particularly relates to methods and apparatus for throttling and interrupting the flow of an abrasive fluid. Specifically, this invention is directed to an improved shutoff valve for interrupting the flow of an abrasive fluid, such valve having a greatly extended useful life.

There are many instances where the flow of abrasive fluids, i.e., either liquids or gases containing undissolved granulated particles of hard material, must be continuously controlled and periodically interrupted. For example, it is well known that oil and gas flowing directly to the surface from subterranean rock or earth formations will contain a large amount of sand or other granulated rock particles. Although these sand particles are small, they are usually composed of quartzite or some other similar material, and thus are relatively quite hard and abrasive in character.

It is also well known that gas and crude oil often flows to the surface under hundreds of pounds of wellhead pressure. Thus, the velocity of the fluid flowing across the shutoff seating surfaces in the valve tends to increase as the surfaces are moved together, and as flow is accordingly restricted. Thus the velocity of these particles across or between the surface is greatest just before the surfaces are brought into fluid-sealing engagement (or separated). Consequently, the useful life of such a valve is directly related, not only to the character and pressure of the fluid sought to be controlled, but also to the number of times such valves need to be opened and closed. Conventional valves can therefore be opened and closed only a relatively few times, before the seating surfaces become scored and abraded to the extent that they are incapable of completely interrupting fluid flow under pressures which are commonly encountered in the oil and gas industry. Consequently, it is presently necessary to frequently replace conventional valves irrespective of the expense, inasmuch as these valves necessarily have a very short useful life.

Many attempts have been made to solve this problem. For example, U.S. Pat. No. 1,970,726, which issued Aug. 21, 1934, to J. M. Barrett, discloses a valve having throttling components as well as shutoff components, whereby fluid flow is first throttled down to a minimum at a point downstream from the shutoff surfaces before the shutoff surfaces are brought closer together. Thus, the velocity of the fluid flowing across the shutoff surfaces is kept to a minimum while the shutoff surfaces are moved together to completely interrupt all flow. Likewise, when the Barrett valve is opened, the throttling components act to keep the velocity of the fluid across the shutoff surfaces at a minimum while the shutoff surfaces are still in close proximity to each other.

There is no doubt that valves of the type generally depicted in the aforementioned Barrett patent are better than simple shutoff valves and stopcocks for interrupting the flow of abrasive fluid, inasmuch as such valves are widely used in the oil and gas industry. However, it should be noted that the abrasion problem has not been solved with such a valve. Instead, the abrasion problem has merely been partially transferred to the throttling surfaces, since the throttling surfaces are quickly scored and abraded, within a relatively short time, and since the shutoff surfaces are also still subjected to considerable abrasion. Moreover, when the throttling surfaces become worn away to the extent that effective throttling cannot be obtained, the shutoff surfaces are thereupon subjected to the full abrasive force of the fluid.

It is obvious that it is inconvenient as well as expensive to remove and replace a shutoff valve which is installed in a high-pressure line. Thus, many attempts have been made to provide a shutoff valve having a longer useful operating life. For example, see U.S. Pats. No. 1,588,645; No. 2,014,314; No. 2,685,294; No. 2,866,477; No. 3,033,-323; No. 3,125,122; and No. 3,145,010, for modifications and variations of the valve apparatus depicted in Barrett No. 1,970,726. However, none of these many attempts have proven successful in providing a long-lived shutoff valve which would be suitable for interrupting and controlling the high-pressure flow of an abrasive fluid.

These disadvantages of the prior art are overcome with the present invention. and apparatus is provided herewith for controlling and interrupting a high-pressure flow of an abrasive fluid. In particular, novel apparatus is provided for interrupting such flow, which apparatus is both long-lived in operation as well as simple and inexpensive to repair. Moreover, such apparatus is designed so as to permit the use of different, and thus more suitable, materials for the shutoff and throttling surfaces.

The advantages of the present invention are preferably obtained with improved shutoff and throttling valve apparatus, wherein a throttling plunger is provided which effectively throttles fluid flow through the valve while the shutoff surfaces are still relatively far apart, and which is thereafter thrust farther or deeper into the throttling passageway while the shutoff surfaces of the valve are brought together to interrupt fluid flow through the valve. It is preferable in such a valve that the area encompassed by the shutoff surfaces be substantially greater than the cross-sectsional area of the throttling passageway, and that there be provision for a chamber intermediate the shutoff surfaces and the entrance of the throttling passageway, wherein the velocity of the fluid flowing through the valve is substantially less than within the throttling passageway.

These and other features and advantages of the present invention will be apparent in the following detailed description wherein reference is made to the figures in the accompanying drawings.

In the drawings:

FIG. 1 is a pictorial representation, partly in cross section, of a valve assembly in closed condition and embodying one form of the present invention.

FIG. 2 is a pictorial representation, partly in cross section, of the shutoff and throttling components of the valve assembly depicted in FIG. 1, such components being shown in an open condition.

FIG. 3 is a pictorial representation, partly in cross section of a non-elected modification of the apparatus depicted in FIG. 2.

FIG. 7 is a pictorial representation, partly in cross section, of a modified version of the apparatus depicted in FIG. 1.

FIG. 8 is a different pictorial representation, partly in cross section, of a portion of the apparatus depicted in FIG. 7.

Figure 4:
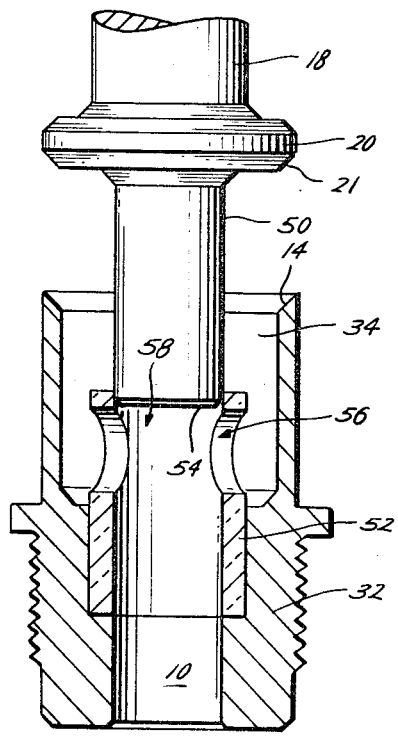
FIG. 4 is a pictorial representation, partly in cross section, of another modification of the valve components depicted in FIG. 2.

Referring now to FIG. 1, there may be seen a pictorial representation of the valve assembly suitable for both throttling and interrupting flow of abrasive fluid. In particular, FIG. 1 shows a T-shaped hollow valve body 2 having an inlet port 4 located in the end of one leg. The inner surface of the inlet port 4 may be threaded, as depicted in FIG. 1, for attachment to a pipe or other conventional fluid conduit (not depicted). Alternatively, flanges or other suitable connecting means may be provided.

A hollow valve seat insert 8, having a narrow cylindrical throttling passageway 10 along its axis, may be seen to be threadably inserted in the valve body 2 adjacent the outlet port 6, so as to receive fluid from the inlet port 4. A valve stem 18, having a disc-like shutoff member 20 and a cylindrically-shaped throttling plunger 22, is shown arranged in the hollow valve body 2 so as to move axially of the hollow valve seat insert 8 and passageway 10. More particularly, valve stem 18 is preferably arranged so as to snugly but slideably move the throttling plunger 22 in and out of the passageway 10, along substantially the entire length of the throttling plunger 22. As may further be seen in FIG. 1, the throttling plunger 22 is provided with a conically-shaped throttling tip 24.

The upper interior portion of the valve seat insert 8 forms a chamber which is hereinafter referred to as the velocity reduction chamber 12, the cross section of which is preferably at least twice the cross section of the passageway 10. The upper surface of the valve seat insert 8 is preferably inwardly beveled to provide a shutoff seat 14 for the shutoff valve member 20.

The throttling plunger 22 is preferably only slightly smaller in diameter than the inside diameter of the passageway 10, so that when the throttling plunger 22 is thrust into the throttling passageway 10, only a slight leakage or seepage of fluid will occur through the valve body 2 between ports 4 and 6. A throttling insert 16, which may be made of a hard but inexpensive material, may be inserted in the valve seat insert body 8 as depicted in FIG. 1, to provide a replaceable section of the throttling passageway 10.

Referring now to FIG. 2, which shows the shutoff and throttling parts of the valve assembly in their "open" condition, it may be seen that the valve stem 18 has been raised (by conventional means not depicted) so that the throttling tip 24 is moved completely out of the throttling insert 16. Thus, it will be apparent that when the valve stem moves downward towards the passageway 10, the fluid flow volume through the passageway 10 will be restricted progresively as the throttling tip 24 enters the throttling insert 16, and will be "throttled" or reduced to a minimum when the throttling tip 24 moves completely into the throttling insert 16. As may be seen in FIGS. 1 and 2, the inside edge 17 of the upper end of the throttling insert 16 may be inwardly beveled to facilitate entry of the throttling tip 24 and plunger 22 into the throttling passageway 10.

After the throttling tip 24 enters fully into the throttling insert 16, the volume of fluid flowing through the passageway 10 will be reduced to a minimum and will not be changed as the throttling plunger 22 passes further into the throttling insert 16 and passageway 10. Accordingly, the velocity of the fluid flow between the shutoff member 20 and the shutoff valve seat 14, will be held to a minimum as the shutoff member 20 approaches the shutoff valve seat 14, once the throttling plunger 22 has moved into proper throttling engagement with the throttling insert 16 and passageway 10. This prevents the shutoff surfaces 21 and 14 from being abraded and scored by high-pressure liquid or gas flow which would otherwise occur when the shutoff valve member 20 moves into close proximity to the shutoff valve seat 14.

As may be seen in FIGS. 1 and 2, the section 19 of the valve stem 18 in between the throttling plunger 22 and the shutoff valve member 20, may be frusto-conical in shape. The shape of section 19 is immaterial to the purposes of this invention, provided that it is formed so as not to impede movement of the throttling plunger 22 into the throttling insert 16 and passageway 10.

It may be seen that the throttling plunger 22 will travel a substantial predetermined distance between the moment effective throttling is obtained, and the moment when complete shutoff is achieved. The length of this travel, which will hereinafter be referred to as "overtravel" is a feature of this invention which substantially prolongs the useful life of the forms of the apparatus depicted herein. In other words, the abrading effect of the fluid is concentrated primarily at the throttling tip 24 and lower portion of the plunger 22, and the mouth and upper portions of the throttling insert 16. Although abrasion cannot be avoided, these portions of the valve assembly may be made of a very hard but inexpensive material, such as tungsten carbide, tool steel, or even a ceramic material. Furthermore, it will be apparent that effective throttling will be achieved at any time any unabraded portion of the throttling plunger 22 is inserted fully within the throttling insert 16. Although a considerable length of the throttling plunger 22 is abraded or worn away, a valve assembly of this type will continue to operate effectively. It may thus be stated that the useful life of this type of valve assembly is substantially equal to the life of the throttling plunger 22, and the useful life of the throttling plunger is determined primarily by the amount of overtravel provided for in the valve assembly.

It will be apparent, moreover, that after the throttling plunger 22 is worn away to the extent that the throttling plunger 22 cannot effectively throttle fluid flow through the throttling insert 16, (even when inserted therein as far as possible) flow velocity cannot be sufficiently reduced in the velocity reduction chamber 12. In such an event, the shutoff surfaces 21 and 14 will necessarily be abraded by high velocity fluid flow each time the shutoff member 20 is moved close to the shutoff valve seat 14. Accordingly, it will thereafter be impossible to completely interrupt fluid flow, and the valve assembly must then be removed and repaired.

It is another feature of the apparatus depicted in FIGS. 1 and 2, that flow velocity between the shutoff surfaces 14 and 21 is minimized while these surfaces are being brought together. This is accomplished by providing that the cross section of the velocity reduction chamber 12 is large in comparison with the cross section of the throttling insert 16 and passageway 10.

As hereinbefore stated, it is preferable that the area encompassed by the shutoff surfaces 14 and 21 be at least twice as great as the cross section of the throttling passageway 10. More particularly, it has been determined that even greater advantages are obtained when the area so encompassed is at least four times the cross section of the throttling passageway 10.

Referring now to FIG. 3 there may be seen a non-elected variation of the apparatus depicted in FIG. 2, wherein the valve stem 18 is similar to that depicted in FIG. 2, and wherein the shutoff member 20 is also similar to its counterpart depicted in FIG. 2. However, it will be noted that the valve seat insert 32 has been foreshortened, and that the throttling insert 38 is only partially disposed or inserted in the narrowed portion of the valve seat insert 32, substantially most of it being located in the velocity reduction chamber 34. It should be further noted that, when the valve stem 18 is fully withdrawn, fluid will flow into the throttling passageway 10, through ports 40 in the throttling insert 38, inasmuch as the throttling plunger 30 depicted in FIG. 3 is a hollow cylinder adapted to slide over the upper end of the throttling insert 38. In this form, the throttling plunger 30 need not move completely out of engagement with the throttling insert 38, but must only be raised so as to open up ports 40.

In the case of FIG. 3, throttling is accomplished when the valve stem body moves downwardly into the valve seat body 32 to close off ports 40 in the throttling insert 38. After flow through the ports 40 has been reduced to a minimum (fluid continuing to seep into ports 40 from between the stem body 30 and the insert 38), the valve stem 18 must move still further to engage the shutoff valve member 20 with the shutoff valve seat 36. In this case, as well as in the case of the apparatus depicted in FIGS. 1 and 2, the throttling insert 38 and the throttling valve stem body 30 may both be made of an inexpensive but very hard, abrasion-resistant material such as boron carbide or even a ceramic material.

Referring now to FIG. 4, there may be seen another variation of the apparatus depicted in FIG. 3, wherein the valve stem 18, shutoff valve member 20, and its beveled surface 21, are all made substantially as previously depicted and described. However, in the case of the apparatus depicted in FIG. 4, it will be noted that the throttling insert 52, although also disposed in the valve seat insert 32 so as to protrude upwardly into the velocity reduction chamber 34, has been foreshortened so that the beveled throttling tip 54 may be moved completely clear of the throttling insert 52, when the valve stem 18 is raised a sufficient distance. Thus, when the valve depicted in FIG. 4 is completely "open," fluid will flow from the inlet port 4 (depicted in FIG. 1) through the open upward end 58 of the throttling insert 52, as well as through ports 56.

Throttling of fluid flow is achieved in the apparatus depicted in FIG. 4 by moving the valve stem 18 downward so as to slide the throttling plunger 50 into the throttling insert 52. As the valve stem 18 moves downward, and as the throttling plunger 50 is thrust deeper into the throttling insert 52, fluid flow through the throttling insert 52 will be gradually reduced as ports 56 are gradually closed off. When the throttling tip 54 passes below the ports 56, the only fluid flow through the valve will be seepage as hereinbefore described.

Figure 5:
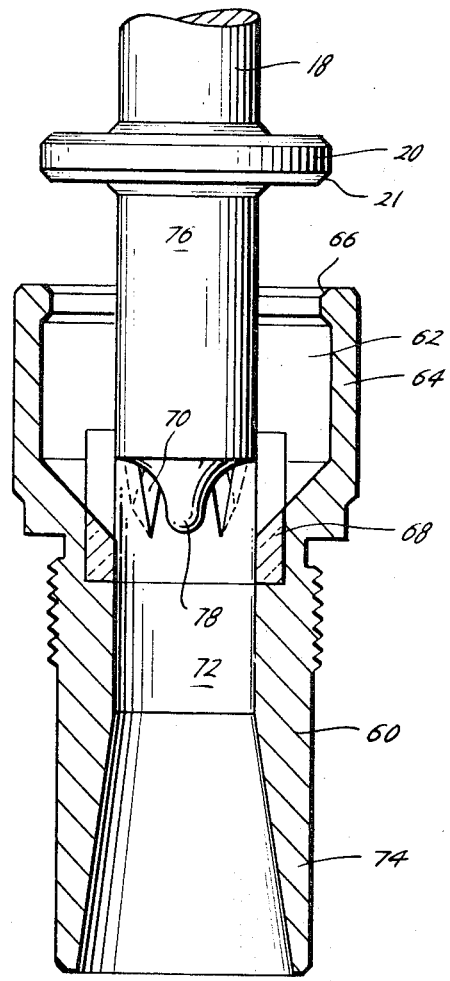
FIG. 5 is a pictorial representation, partly in cross section, of a further modification of the valve components depicted in FIG. 2.
Figure 6:
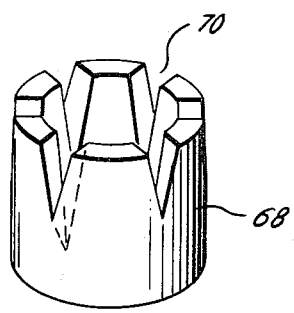
FIG. 6 is an enlarged pictorial representation of a particular part of the apparatus depicted in FIG. 5.

Referring now to FIG. 5, there may be seen a different modification of the forms of the apparatus previously depicted wherein the valve stem 18, shutoff member 20 and its beveled shutoff surface 21, are formed as previously described. In FIG. 5, however, the valve seat insert 60 will be seen to be formed so that the velocity reduction chamber 62 is provided by an outwardly offset extension 64. The throttling insert 68 may be seen to be a hollow cylinder partially embedded in the valve seat insert 60, and having its exposed portion projecting up into the velocity reduction chamber 62. The upper end of the throttling insert 68 may also be seen to be provided with a number of V-shaped notches 70 equally spaced apart as more particularly shown in FIG. 6. The inner surfaces of the throttling insert 68 may be seen to provide an extension of the passageway 72 which extends downwardly through the valve seat insert 60 in an outwardly flaring section 74 along lower portion of the valve seat insert 60.

The lower end of the valve stem 18 is comprised of a round shaft which is the throttling plunger 76 and which terminates in a knob-like extension forming the throttling tip 78.

When the valve stem 18 is raised as far as possible, fluid may flow down into the velocity reduction chamber 62 and, through the V-shaped notches 70 and the upper end of the throttling insert 68, to pass into the throttling passageway 72. As the valve stem 18 is moved further downward, and as the throttling tip 78 begins to pass into the upper end of the throttling insert 68, fluid flow enters the throttling insert 68 substantially only through notches 70. It is the function of the shape of the throttling tip 78 to tend to deflect downward the fluid passing in through the notches 70 so as to reduce the abrasive or eroding effect of the fluid on the throttling tip 78. As the valve stem 18 is thereafter moved further downward, and as the throttling plunger 76 gradually closes off notches 70, fluid flow through the throttling passageway 72 will become restricted in volume but will be accelerated, and this will increase abrasion of the throttling tip 78. However, after the throttling plunger 76 closes off the notches 70, the only fluid flow through the throttling passageway 72 will be limited seepage between the surface of the throttling plunger 76 and the inside of the throttling insert 68, and the velocity of the fluid flowing in the velocity reduction chamber 62 will be reduced to a minimum. Thus, when the shutoff member 20 enters into sealing engagement with the shutoff valve seat 66, fluid flow through the space between the shutoff surfaces 21 and 66 will be slowed to a minimum velocity, and abrasion of surfaces 21 and 66 will be reduced to a minimum.

It is essential with this form of the invention that, within practical limitations, maximum overtravel be provided for the throttling plunger 76. Therefore, it is preferable that the length of the throttling plunger 76 be long enough so that the throttling tip 78 move a substantial distance downward past the notches 70 and into the throttling insert 68 and passageway 72 before the shutoff member 20 engages the shutoff valve seat 66.

Referring now to FIGS. 7 and 8, there may be seen a further variation of the apparatus previously depicted in FIGS. 1–6. In particular, there is a T-shaped hollow valve body 80 having a fluid inlet port 82 located in the shank of the T, and having a fluid outlet port 84 located in the left end of the cross bar of the T. A hollow valve seat insert 86 may be seen to be threadably disposed in the left end of the cross bar of the T, and having its upper end beveled so as to provide a shutoff valve seat 88 when engaged by the beveled surface 92 of the shutoff member 90. The inside diameter of the upper portion 94 of the valve seat insert 86, may be seen to be substantially larger than the inside diameter of the throttling insert 96 in the valve seat insert 86, and the inside diameter of the throttling passageway 98 extending therethrough.

As shown in FIG. 7, the shutoff member 90 may be slidably mounted on a bolt 100 which is threadably inserted into the lower end of a mandrel 102 attached to a valve bonnet 104. The valve bonnet 104, and its other parts and fittings, are conventionally connected to means (not depicted) for moving the throttling plunger 108 slidably and rotatably upward and downward axially of the valve seat insert 86 and throttling passageway 98. The shutoff member 90 is retained to bolt 100 by means of a hexagonally shaped bolt head 106.

It will be noted in FIGS. 7 and 8 that the lower end of the throttling plunger 108 is shaped with two inwardly sloping surfaces 110 so as to deflect in a downward manner fluid entering the throttling insert 96, as the throttling plunger 108 is moved into the upper end of the throttling insert 96. This deflection action has been found to substantially reduce the eroding effect of an abrasive fluid passing into the throttling insert 96. It will also be noted that the upper end of the throttling insert 96 is provided with an inwardly facing beveled surface 112 to improve entry of the throttling plunger 108 into the throttling insert 96.

Many other variations and modifications will be apparent in the depicted techniques and apparatus. Accordingly, it should be clearly understood that the forms of the invention described herein, and depicted in the accompanying drawings, are intended to be illustrative only, and are not intended to limit the scope of this invention.

What is claimed is:

1. A combination throttling and shutoff valve for controlling fluid flow under high pressure, said valve comprising:
   a hollow valve body having inlet and outlet ports, a shutoff portion located between said inlet and outlet port, said shutoff portion having an opening communicating with a velocity reduction chamber formed by a wall portion extending toward said shutoff portion from a throttling section, said throttling section having an opening with a cross-sectional area less than one-half the area of the opening in said shutoff portion,
   a valve stem movable slidably through said valve body and having one end thereof a throttling plunger for first substantially blocking said throttling section to retard the flow of said fluid across said shutoff portion and thereafter to penetrate and slidably occupy a substantial portion of said throttling section, and
   a closure means arranged on said valve stem for sealing engagement with said shutoff portion after said throttling plunger has substantially occupied said throttling section.

2. Apparatus as described in claim 1, wherein said throttling plunger comprises:
   a tip section adapted to progressively restrict and thereafter throttle fluid flow through said throttling section, and
   a cylindrical portion interconnecting said tip section and said closure means and adapted to snugly and slidably engage said throttling section.

3. Apparatus as described in claim 2, wherein said tip section further comprises:
   a conical end section adapted to progressively restrict and thereafter throttle fluid flow into and through said throttling section.

References Cited

UNITED STATES PATENTS

| | | | |
|---|---|---|---|
| 608,342 | 8/1898 | McElroy | 251—122 |
| 717,437 | 12/1902 | McCall | 251—122 X |
| 971,162 | 9/1910 | Winkler | 251—122 X |
| 1,588,645 | 6/1926 | Barrett | 251—121 X |
| 1,777,261 | 9/1930 | Grainger | 251—121 |
| 1,962,558 | 6/1934 | Guildford | 251—210 |
| 2,918,087 | 12/1959 | Curran | 251—118 X |
| 3,059,894 | 10/1962 | Knecht et al. | 251—121 |
| 795,715 | 7/1905 | Lofton | 137—625.3 X |
| 2,117,182 | 5/1938 | Lewis | 137—625.3 |
| 2,387,792 | 10/1945 | Holmes | 137—625.3 X |
| 2,454,160 | 11/1948 | Greene | 251—368 X |
| 2,847,183 | 8/1958 | Buri | 251—363 |
| 3,044,743 | 7/1962 | Siegel | 251—363 X |

FOREIGN PATENTS 201,809   8/1923   Great Britain.

WILLIAM I. PRICE, Primary Examiner

L. G. MACHLIN, Assistant Examiner

U.S. Cl. X.R.

251—210